United States Patent
Filippova et al.

(10) Patent No.: US 10,229,111 B1
(45) Date of Patent: Mar. 12, 2019

(54) SENTENCE COMPRESSION USING RECURRENT NEURAL NETWORKS

(71) Applicant: Google LLC, Mountain View, CA (US)

(72) Inventors: Ekaterina Filippova, Zürich (CH); Enrique Alfonseca, Horgen (CH); Carlos Alberto Colmenares Rojas, Zürich (CH); Lukasz Mieczyslaw Kaiser, Mountain View, CA (US); Oriol Vinyals, London (GB)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 15/423,852

(22) Filed: Feb. 3, 2017

Related U.S. Application Data (60) Provisional application No. 62/290,575, filed on Feb. 3, 2016.

(51) Int. Cl.
  *G06N 3/04* (2006.01)
  *G06F 17/21* (2006.01)
  *G06F 17/27* (2006.01)

(52) U.S. Cl.
  CPC .......... *G06F 17/277* (2013.01); *G06F 17/21* (2013.01); *G06F 17/2705* (2013.01); *G06N 3/0445* (2013.01)

(58) Field of Classification Search
  CPC .... G06F 17/277; G06F 17/21; G06F 17/2705; G06N 3/0445
  USPC .......................................................... 704/9
  See application file for complete search history.

(56) References Cited

U.S. PATENT DOCUMENTS

| 5,682,539 | A  | * | 10/1997 | Conrad | G06F 17/28 |
|           |    |   |         |        | 704/9 |
| 9,122,674 | B1 | * | 9/2015 | Wong | G06F 17/28 |
| 9,152,622 | B2 | * | 10/2015 | Marcu | G06F 17/2854 |
| 9,213,694 | B2 | * | 12/2015 | Hieber | G06F 17/2854 |

(Continued)

OTHER PUBLICATIONS

Berg-Kirkpatrick et al. "Jointly learning to extract and compress," Proceedings of the 49th Annual Meeting of the Association for Computational Linguistics: Human Language Technologies—vol. 1. Association for Computational Linguistics, Jun. 19, 2011, 10 pages.

(Continued)

*Primary Examiner* — Edwin S Leland, III
(74) *Attorney, Agent, or Firm* — Fish & Richardson P.C.

(57) ABSTRACT

Methods, systems, apparatus, including computer programs encoded on computer storage medium, for generating a sentence summary. In one aspect, the method includes actions of tokenizing the sentence into a plurality of tokens, processing data representative of each token in a first order using an LSTM neural network to initialize an internal state of a second LSTM neural network, processing data representative of each token in a second order using the second LSTM neural network, comprising, for each token in the sentence: processing the data representative of the token using the second LSTM neural network in accordance with a current internal state of the second LSTM neural network to (i) generate an LSTM output for the token, and (ii) to update the current internal state of the second LSTM neural network, and generating the summarized version of the sentence using the outputs of the second LSTM neural network for the tokens.

20 Claims, 3 Drawing Sheets

(56) References Cited

U.S. PATENT DOCUMENTS

| | | | | |
|---|---|---|---|---|
| 2015/0356401 | A1* | 12/2015 | Vinyals | G06N 3/02 706/15 |
| 2016/0180215 | A1* | 6/2016 | Vinyals | G06N 3/088 706/20 |
| 2016/0196258 | A1* | 7/2016 | Ma | G06F 17/2785 704/8 |
| 2016/0352657 | A1* | 12/2016 | Galley | H04L 51/02 |
| 2017/0140263 | A1* | 5/2017 | Kaiser | G06F 17/16 |
| 2017/0169822 | A1* | 6/2017 | Fujita | G10L 15/16 |
| 2017/0169853 | A1* | 6/2017 | Hu | H04N 21/233 |
| 2017/0213130 | A1* | 7/2017 | Khatri | G06N 3/0445 |
| 2017/0270407 | A1* | 9/2017 | Alberti | G06N 3/04 |
| 2017/0337479 | A1* | 11/2017 | Trischler | G06F 17/2785 |
| 2017/0351663 | A1* | 12/2017 | Sordoni | G06F 17/278 |
| 2017/0365252 | A1* | 12/2017 | Ushio | G06N 3/0445 |
| 2017/0372694 | A1* | 12/2017 | Ushio | G10L 21/0272 |
| 2018/0046614 | A1* | 2/2018 | Ushio | G06F 17/2755 |
| 2018/0061408 | A1* | 3/2018 | Andreas | G10L 15/063 |
| 2018/0075343 | A1* | 3/2018 | van den Oord | G06F 17/2818 |
| 2018/0121785 | A1* | 5/2018 | Min | G06N 3/0454 |
| 2018/0144208 | A1* | 5/2018 | Lu | G06F 17/241 |
| 2018/0150905 | A1* | 5/2018 | Lee | G06F 3/0485 |
| 2018/0174020 | A1* | 6/2018 | Wu | G06N 3/006 |

OTHER PUBLICATIONS

Cho et al. "Learning phrase representations using rnn encoder-decoder for statistical machine translation," arXiv preprint arXiv 1406.1078 Sep. 3, 2014, 15 pages.

Clarke et al. "Global inference for sentence compression: An integer linear programming approach," Journal of Artificial Intelligence Research, vol. 31, 2008, 31 pages.

Clarke et al. "Models for sentence compression: A comparison across domains, training requirements and evaluation measures," in Proc. of COLING-ACL Jul. 17, 2006, 8 pages.

Cohn et al. "Sentence compression beyond word deletion," in Proc. of COLING, Aug. 18, 2008, 8 pages.

Crammer et al. "Ultraconservative online algorithms for multiclass problems," Journal of Machine Learning Research, Jan. 3, 2003, 41 pages.

Filippova et al. "Overcoming the lack of parallel data in sentence compression," in Proc. of EMNLP—2013, 11 pages.

Filippova et al. "Sentence Compression by Deletion with LSTMs," in EMNLP, Sep. 2015, 9 pages.

Hockretier et al. "Long short-term memory," Neural Computation vol. 9, No. 8, Nov. 15, 1997, 46 pages.

Jing et al. "Sentence reduction for automatic text summarization," in Proc. of ANLP, Apr. 29, 2000, 6 pages.

Knight et al. "Statistics-based summarization—step one: Sentence compression," in Proc. of AAAI, Jul. 30, 2000, 8 pages.

Li et al. "A hierarchical LSTM autoencoder for paragraphs and documents," arXiv preprint arXiv1506.01057v2, Jun. 6, 2015, 10 pages.

Luong et al. "Addressing the rare word problem in neural machine translation," arXiv preprint arXiv 1410.8203, May 30, 2015, 9 pages.

McDonald et al. "Online large-margin training of dependency parser," in Proc. of ACL, Jun. 25, 2005, 8 pages.

McDonald. "Discriminative sentence compression with soft syntactic evidence," in Proc. of EACL, Apr. 3, 2006, 8 pages.

Mikolov et al. "Distributed representations of words and phrases and their compositionality," in Advances in Neural Information Processing Systems, 2013, 9 pages.

Napoles et al. "Evaluating sentence compression: Pitfalls and suggested remedies," Proceedings of the Workshop on Monolingual Text-to-text Generation, Portland, OR, Jun. 24, 2011, 109 pages.

Riezler et al. "Statistical sentence condensation using ambiguity packing and stochastic disambiguation methods for Lexical-Functional Grammar," Proc. of HLT-NAACL, May 27, 2003, 8 pages.

Srivastava et al. "Dropout: A simple way to prevent neural networks from overfitting," Journal of Machine Learning Research, 15(1), Jan. 1, 2014, 30 pages.

Sutskever et al. "Sequence to sequence learning with neural networks," Proc. of NIPS, 2014, 9 pages.

Vinyals et al. "Grammar as a foreign language," arXiv preprint arXiv1412.7449, 2015, 9 pages.

Vinyals et al. "Show and tell: A neural image caption generator," Proceedings of the IEEE Conference on Computer Vision and Pattern Recognition, 2015, 9 pages.

Xu et al. "Show, attend and tell: Neural image caption generation and visual attention," Proceedings of ICML, Jun. 1, 2015, 10 pages.

Zaremba et al. "Learning to execute," arXiv preprint arXiv 1410.4615v3, Feb. 19, 2015, 25 pages.

Zhang et al. "Enforcing structural diversity in cube-pruned dependency parsing," in Proc. of ACL, 2014, 6 pages.

* cited by examiner

SENTENCE COMPRESSION USING RECURRENT NEURAL NETWORKS

CROSS-REFERENCE TO RELATED APPLICATION

This application claims the benefit of the U.S. Provisional Application No. 62/290,575 filed Feb. 3, 2016 and entitled "Sentence Compression Using LSTMs," which is hereby incorporated by reference in its entirety.

BACKGROUND

This specification relates to generating a summarized version of a sentence using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network uses some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

According to one innovative aspect of the present disclosure, a method of generating a summarized version of a sentence is disclosed. The method may include actions of tokenizing the sentence into a plurality of tokens, processing data representative of each token in a first order using a first long short-term memory (LSTM) neural network to initialize an internal state of a second LSTM neural network, processing data representative of each token in a second order using the second long short-term memory (LSTM) neural network, comprising, for data representative of each token in the sentence: processing the data representative of the token using the second LSTM neural network in accordance with a current internal state of the second LSTM neural network to (i) generate an LSTM output for the token, wherein the LSTM output indicates whether the token should be included in the summarized version of the sentence, and (ii) to update the current internal state of the second LSTM neural network, and generating the summarized version of the sentence using the LSTM outputs for the tokens.

Other versions include corresponding systems, apparatus, and computer programs to perform the actions of methods, encoded on computer storage devices.

These and other versions may optionally include one or more of the following features. For instance, in some implementations, the plurality of tokens may include a word or a punctuation mark.

In some implementations, the LSTM output for each token may include data indicating that a word corresponding to the token should be included in the summarized version of the sentence, or data indicating that a word corresponding to the token should not be included in the summarized version of the sentence.

In some implementations, the method may further include for each of the plurality of tokens, associating the LSTM output for the token with a word corresponding to the token.

In some implementations, generating the summarized version of the sentence using the LSTM outputs for the tokens may include selecting only a subset of words that correspond to the tokens that are each associated with data indicating that the word corresponding to the token should be included in the summarized version of the sentence. The selected subset of words that correspond to the tokens used to generate the summarized version of the sentence may remain in the same order that each respective word appeared in the sentence prior to tokenization.

In some implementations, the first order of tokens may include an order of tokens corresponding to words in the sentence that is the reverse of the order the words corresponding to the tokens appeared in the sentence.

In some implementations the second order of tokens may include an order of tokens corresponding to words in the sentence that is the same order that the words corresponding to the tokens appeared in the sentence.

In some implementations, processing data representative of each token in a second order using the second long short-term memory (LSTM) neural network may further include, for each token in the sentence: processing data indicative of whether (1) the preceding token has been processed and a word corresponding to the preceding token should be included in the summarized sentence, or (2) the preceding token has been processed and a word corresponding to the preceding token should be removed from the summarized sentence.

In some implementations, the method may further include parsing the sentence in order to generate a dependency tree, wherein processing data representative of each token in a second order using the second long short-term memory (LSTM) neural network, may further include, for each token in the sentence: processing the data representative of the token and data representing a corresponding parent token in the dependency tree.

In some implementations, the method may further include parsing the sentence in order to generate a dependency tree, wherein processing each token in a second order using the second long short-term memory (LSTM) neural network, may further include, for each token in the sentence: processing data representative of the token, data representative of a corresponding parent token in the dependency tree, the LSTM output for the previous token, a flag indicating whether the parent token has been processed and should be included in the summarized sentence, a flag indicating whether the parent token has been processed and should be removed from the summarized sentence, and a flag indicating whether the parent token will be processed later in the second order of tokens.

In some implementations, the sentence may be received from a user device.

In some implementations, the method may further include providing the summarized version of the sentence for output on the user device. Providing the summarized version of the sentence for output on the user device may include: providing the summarized version of the sentence for display on the user device, or providing the summarized version of the sentence for playback through a speaker of the user device.

In some implementations, method may further include obtaining, by a server, one or more documents that includes a sentence.

In some implementations, providing, by the server, to a user device the summarized version of the sentence may include providing the summarized sentence for output on the user device.

In some implementations, providing, by the server, to a user device the summarized version of the sentence for output on the user device may include providing, by the server, to the user device the summarized version of the sentence for display on the user device, or providing, by the server, to the user device the summarized version of the sentence for playback through a speaker of the user device.

In some implementations, the one or more documents may include a web page.

The subject matter of the present disclosure provides multiple advantages over conventional methods. For instance, the present disclosure achieves sentence compression without requiring the use any semantic analysis of the sentence or any other linguistic preprocessing tools except a tokenizer. Moreover, the present disclosure achieves sentence compression with increased accuracy over conventional methods.

These and other versions each may optionally include one or more of the following features.

The details of these, and other, implementations are set forth in the accompanying drawings and description below. Other features and advantages will be apparent from the description and drawings, and from the claims.

DETAILED DESCRIPTION

This specification describes how a system implemented as computer programs on one or more computers in one or more locations can generate a summarized version of a sentence using a recurrent neural network. The sentence may include a plurality of words and/or punctuation. In one implementation, the recurrent neural network may include, for example, a Long Short-Term Memory (LSTM) neural network.

Figure 1:
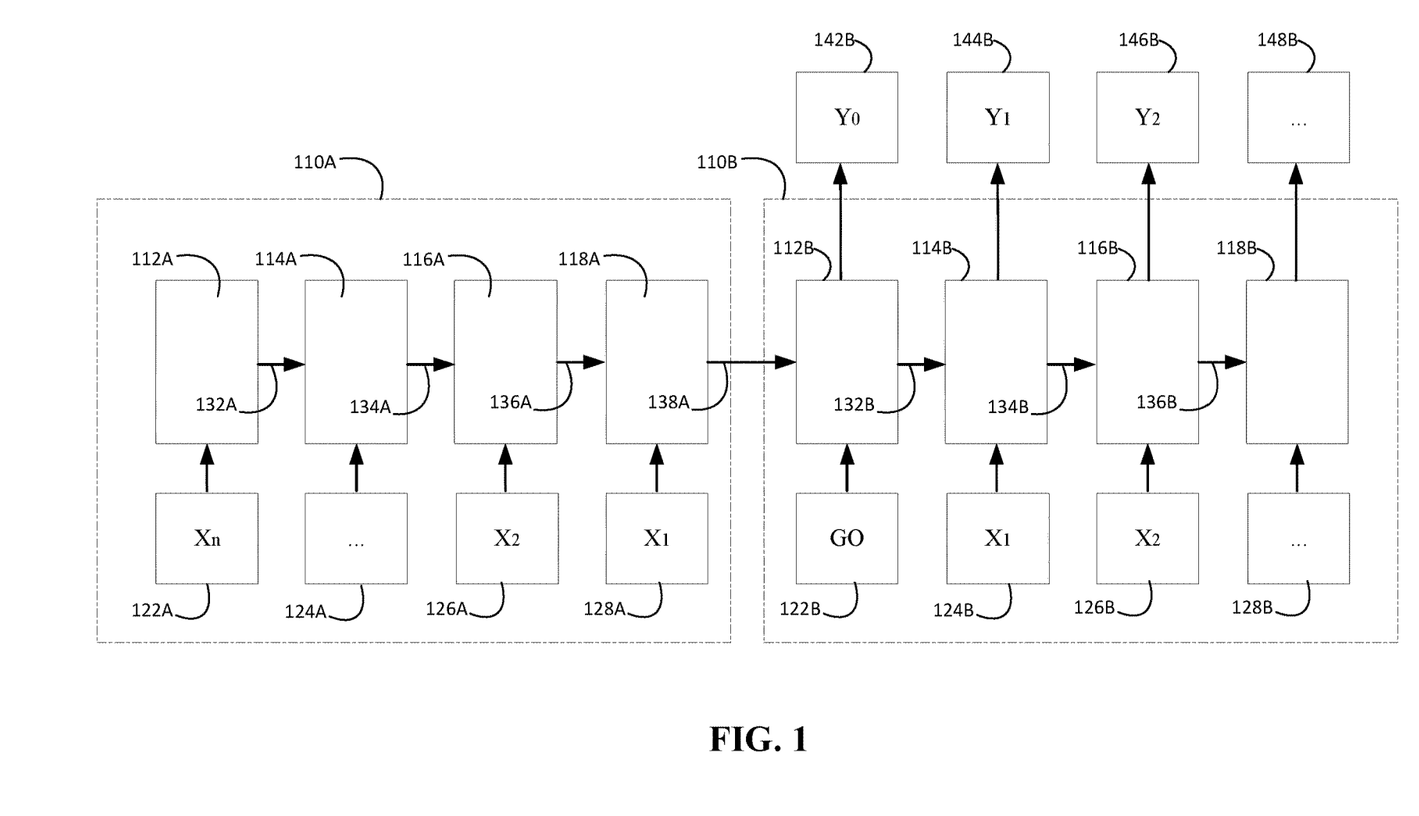
FIG. 1 is a contextual diagram of an example of a recurrent neural network system that can be used to generate a summary of a sentence.

FIG. 1 is a contextual diagram of an example of a recurrent neural network system 100 that can be used to generate a summary of a sentence. The neural network system 100 may include a first recurrent neural network 110A that processes data representing each token of a sentence in a first order and a second recurrent neural network 110B that processes data representing each token of a sentence in a second order. In some implementations, the first recurrent neural network 110A and the second recurrent neural network 110B may be the same recurrent neural network.

For each recurrent neural network of FIG. 1, the diagram provides an example of the inputs to each respective neural network at different points in time. For example, the inputs to the first neural network 110A are shown at stages 112A, 114A, 116A, 118A and the inputs to the second neural network 110B are shown at stage 112B, 114B, 116B, 118B. These respective inputs to each respective neural network highlights the recurrent nature of the recurrent neural networks 110A, 110B.

The recurrent neural network system 100 may receive a plurality of tokens 122A, 124A, 126A, 128A generated by a tokenizer based on an obtained sentence. Each of the plurality of tokens 122A, 124A, 126A, 128A may correspond to a word from a sentence. For example, a token 122A may include one or more features representing a word from a sentence. The recurrent neural network 110A may process data representing the plurality of tokens in a first order such as a reverse order that the word corresponding to each respective token appears in the obtained sentence. At stage 112A the recurrent neural network 110A may receive, as an input, data representing token 122A "$X_n$," which corresponds to the last word in the obtained sentence and then process (i) the data representing the token 122A "$X_n$" and (ii) the initial state of the recurrent neural network 210A in order to generate an output 132A. The output 132A includes an updated state of the recurrent neural network 110A. At stage 112A, the diagram does not indicate that the recurrent neural network 110A produced an output indicating whether or not the word corresponding to token 122A "$X_n$" should be included in the sentence summary. This is because the recurrent neural network 110A has not yet been provided data such as a "GO" token that instructs the recurrent neural network 110A to begin making predictions as to whether or not the word corresponding to the processed input token should be included in the sentence summary. In some implementations, the recurrent neural network 110A may still generate such an output, but the output will be not captured and used by the system 100 until data such as a "GO" token is received.

At stage 114A, the recurrent neural network 110A will receive as an input an updated current state 132A of the recurrent neural network 110A and the data representing a token 124A that corresponds to the next to last word of the obtained sentence. At stage 114A, the recurrent neural network 110A processes (i) the updated current state of the recurrent neural network 110A and (i) data representing the token 124A in order to generate an updated state 134A. In a similar manner, at stage 116A, the recurrent neural network 110A will receive an updated current state 134A and data representing a token 126A "$X_2$" that corresponds to the next word in the obtained sentence, process (i) the updated current state 134A and (ii) the data representing the token 126A "$X_2$" in order to generate an updated current state 136A. At stage 118A, the recurrent neural network 110A may receive as an input the updated current state 136A and data representing a token 128A "$X_1$" that corresponds to the first word in the obtained sentence. The recurrent neural network 110A may then process (i) the updated current state 136A and (ii) the data representing the token 128A "$X_1$" in order to generate an updated current state 138A that can be used to initialize the second neural network 110B. Though four stages are described in the example of recurrent neural network 110A, more or less stages can be performed based on the number of tokens generated from the obtained sentence.

The recurrent neural network 110B is then configured to be initialized using the updated current state 138A. After processing data representing each token corresponding to respective words of the obtained sentence in the first order, the recurrent neural network system 100 receives data such as a "GO" token 122B at stage 112B that instructs the recurrent neural network 110B to start making predictions. The recurrent neural network 110B may process (i) the updated current state 138A and (ii) the "GO" token at stage 112B, and output an updated current state 132B and data 142B indicating the beginning of a string of data that indicates whether or not a word from the obtained sentence corresponding to each respective token should be included in a summary of the obtained sentence or not included in a summary of the obtained sentence.

After processing the "Go" token, the recurrent neural network 110B will begin processing data representing the tokens corresponding to words of the obtained sentence in a second order that is opposite the first order. At stage 114B, the recurrent neural network 110B will receive input of an updated current state 132B and data representing a first token 124B "$X_1$" that corresponds to the first of word of the obtained sentence. The recurrent neural network 110B will process (i) the updated current state 132B and (ii) the data representing the token 124B "$X_1$" and generate an output that includes a first component and a second component. The first output component includes data 144B that is indicative of whether the word corresponding to token 124B "$X_1$" should be included in the summary of the obtained sentence. The first output component is based on probabilities generated by the recurrent neural network 110B based on the processing of (i) the updated current state 132B and (ii) the data representing token 124B "$X_1$". The second component 134B, also generated based on the recurrent neural network's 110B processing of (i) the updated current state 132B and (ii) the data representing the token 124B "$X_1$," includes data that is indicative of the updated current state of the recurrent neural network 110B.

At stage 116B, the recurrent neural network 110B will receive input of an updated current state 134B and data representing the token 126B "$X_2$" that corresponds to the second word of the obtained sentence. In some implementations, the recurrent neural network 110B may also receive, as an input, data (e.g., "$Y_1$") indicating a determination of whether or not the word corresponding to token 124B "$X_1$" should be included in the summary of the obtained sentence. The recurrent neural network 110B will process (i) the updated current state 134B, (ii) the token 126B "$X_2$," and, if received, (iii) data indicating a determination of whether or not the word corresponding to token 124B "$X_1$" should be included in the summary of the obtained sentence, and generate an output that includes a first component and a second component. The first output component includes data 146B that is indicative of whether the word from the obtained sentence corresponding to data representing the token 126B "$X_2$" of the obtained sentence should be included in the summary of the obtained sentence. The first output component is based on probabilities generated by the recurrent neural network 110B based on the processing of (i) the updated current state 134B, data representing the token 126B "$X_2$", and also, if received, (iii) data indicating a determination of whether or not the word corresponding to token 124B "$X_1$" should be included in the summary of the obtained sentence. The second output component 136B, also generated based on the recurrent neural network's 110B processing of (i) the updated current state 134B, the token 126B "$X_2$", and also, if received, (iii) data indicating a determination of whether or not the word corresponding to token 124B "X1" should be included in the summary of the obtained sentence, includes data that is indicative of the updated current state of the recurrent neural network 110B.

The recurrent neural network 110B will continue to perform the aforementioned recursive steps until each token of the obtained sentence has been processed by the recurrent neural network 110B. The recurrent neural network system 100 will then use the generated outputs 142B, 144B, 146B, 148B in order to determine identify words for inclusion in a summary of the obtained sentence.

In some implementations, the recurrent neural network 110B may be trained to output, at each stage 112B, 114B, 116B, 118B, data indicating that a word corresponding to the token should be included in the summary such as a "1" or output data indicating that a token should not be included in the summary such as a "0." Alternatively, the recurrent neural network 110B may output, at each stage 112B, 114B, 116B, 118B, a probability. In such implementations, the system 100 may determine to keep the word corresponding to the token data processed at each respective stage 112B, 114B, 116B, 118B if the probability p output at the respective stage satisfies a threshold. Alternatively, the system 100 may determine to keep a word corresponding to the token data processed at each respective stage 112B, 114B, 116B, 118B with a probability p and determine to not keep the word with probability 1−p, where p is the recurrent neural network 110B output.

The recurrent neural network system 100 generates a summary of the obtained sentence by selecting words corresponding to each token of the plurality of tokens where the recurrent neural network 110B produced a value indicating that the respective word corresponding to the respective token should be included in the summary of the obtained sentence.

Figure 2:
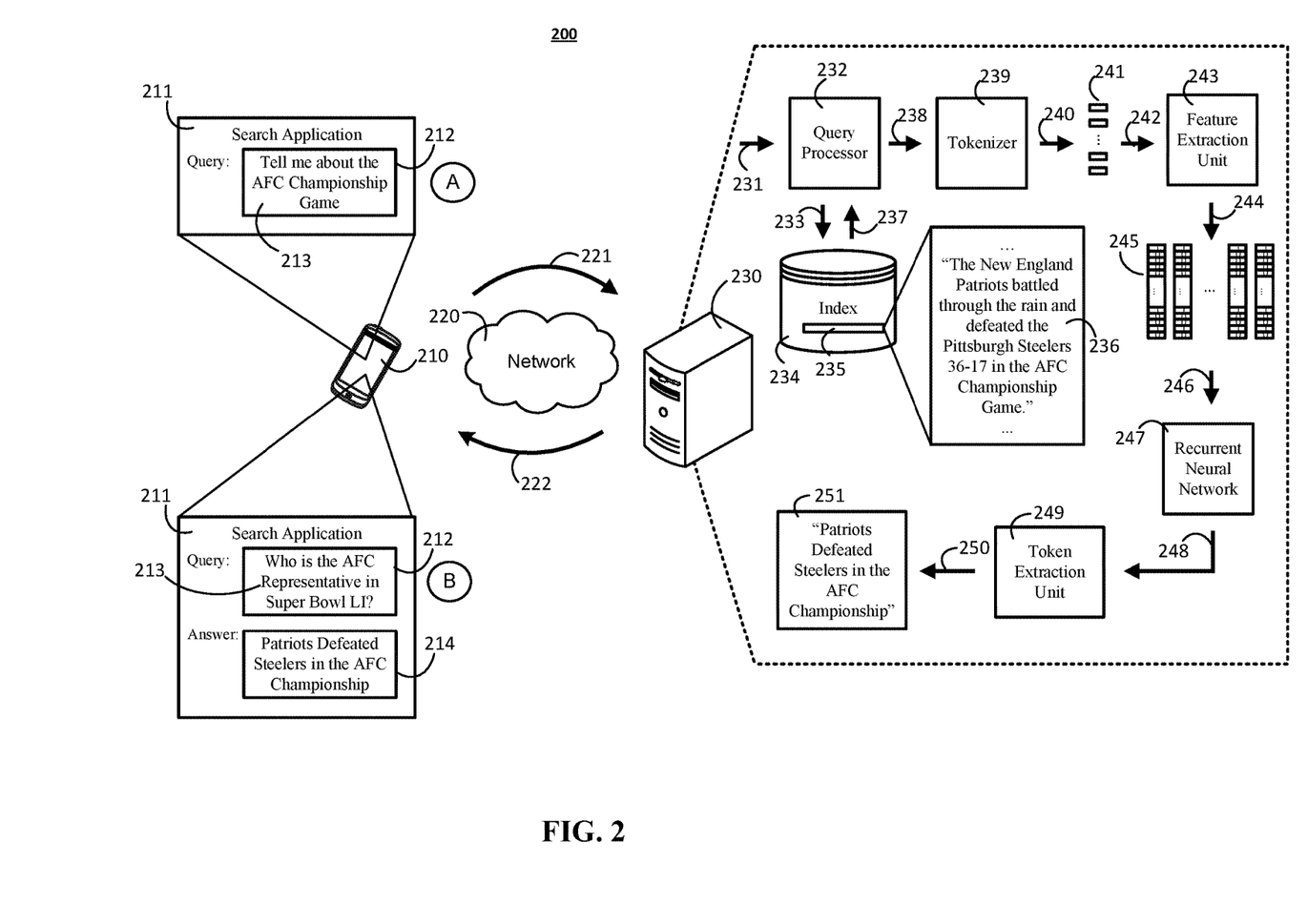
FIG. 2 is a block diagram of a system for generating a summary of a sentence using a recurrent neural network.

FIG. 2 is a block diagram of a system 200 for generating a summary of a sentence using a recurrent neural network system. The system 200 includes a user device 210, a network 220, and a server 230.

A user may access a search application installed on the user device 210. The search application provides a user interface 211 that includes an input box 212 that is configured to receive a search query such as search query 213. In the example of system 200, at stage A, a user has input a search query 213 that includes a question "Tell me about the AFC Championship Game." The search query 213 may be input by the user typing one or more characters on a keypad or input by uttering a voice query that was detected by a microphone on the user device. Alternatively, a user may select a query from a list of predefined queries provided for display via the user interface 211. The user device 210 can transmit 221 the search query 213 to the server 230 via the network 220. The network 220 may include, for example, one or more of a LAN, a WAN, a cellular network, the Internet, or a combination thereof.

The server 230 receives the search query 213 and provides 231 the search query 213 as an input to a query processor 232. The query processor 232 executes the search query 213. Executing the search query 213 includes searching 233 an index 234. The index 234 may include a plurality of index entries such index entry 235 that include a reference to a resource that is stored either locally on the server 230 or remotely on a different server, or other computer. Each respective index entry 235 may include data that has been extracted from the resource. The data extracted from the resource may include a snippet of the resource, the entire text portion of the resource, or the like. The query processor's 232 search of the index 234 may identify a particular index entry such as index entry 235 that includes a text snippet from a resource that is responsive to the search query 213. The text snippet may include a sentence 236. The sentence 236, in its entirety, reads "The New England Patriots battled through the rain and defeated the Pittsburgh Steelers 36-17 in the AFC Championship Game." The sentence 236 may be returned 237 to the query processor 232. The query processor 232 provides 238 the sentence 236 to the tokenizer 239.

In some implementations, the tokenizer 239 tokenizes the received sentence 236 into a plurality of tokens without performing any semantic analysis on the sentence 236. Each respective token may include, for example, a particular word or punctuation mark of the sentence 236. The set of tokens 241 are output 240 by the tokenizer 239. The set of tokens 241 includes a token for each word or punctuation mark of the sentence 236.

Alternatively, in some implementations, the tokenizer 239 may generate a data structure that captures a relationship amongst the tokens. For example, after tokenizing the sentence 236 into a plurality of tokens, the tokenizer 239 may generate a dependency tree based on semantic relationships existing in the sentence 236. The established dependency tree may allow for more detailed input to be provided to the recurrent neural network 247.

A feature extraction unit 243 may obtain 242 the set of tokens 241. The feature extraction unit is configured to extract features from each respective token that can be used to generate a feature vector that can be provided as an input to a recurrent neural network 247. The extracted features may include, for example, data that is indicative of a particular word or punctuation mark in a set of known words and punctuation marks. Alternatively, or in addition, features extracted from the token may include the token's placement in the sentence, number of words in the sentence associated with the token, and the like.

The feature extraction unit 243 may generate 244 a set of feature vectors 245. The set of feature vectors 245 includes a feature vector for each token in the set of tokens 241. Each feature vector in the set of feature vectors 245 may be provided 246 as an input to the recurrent neural network 247 for processing to determine whether the token that is represented by the feature vector should be kept in a summary of the sentence 236 or deleted from the summary of the sentence 236.

The recurrent neural network 247 may include one or more recurrent neural networks. Each recurrent neural network in the recurrent neural network 247 may include an LSTM neural network. The recurrent neural network 247 may process the feature vectors 245 representing each respective token in a first order. The first order of tokens may be an order that is the reverse of the order the tokens appear in the sentence 236. Then, the system 200 may instruct the recurrent neural network 247 to being generating a prediction as to whether the token that corresponds to each respective feature vector in the set of feature vectors 245 should be kept in the sentence summary or deleted from the sentence summary. In response to receiving an instruction to begin generating predictions, the recurrent neural network 247 may process each respective feature vector in the set of feature vectors for the previous token in a second order. The second order may be different than the first order. For example, the second order of tokens may be an order that is the same order as the tokens appear in the sentence 236.

The output 248 of the recurrent neural network 247 includes a plurality of labels that are indicative of whether each respective token of the set of tokens 241 should be included in a summary of the sentence 236. Each label in the plurality of labels may be associated with a particular token of the set of tokens 240. A label may include a "KEEP" or "DELETE" label. A "KEEP" label may be represented by a positive value such as "1". The "KEEP" label indicates that the token associated with the label should be included in the summary of the sentence 236. A "DELETE" label may be represented by a different number than the number used for the "KEEP" label. For example, the "DELETE" label may be represented by a "0."

The set of labels output 248 by the recurrent neural network 247 may be provided to the token extraction unit 249. The token extraction unit 249 is configured to extract the set of one or more tokens (e.g., words and punctuation) of the sentence 236 that should be used to generate the summary of the sentence 236 based on the received set of labels provided by the recurrent neural network 247. By way of example, the recurrent neural network 247 may be generate "KEEP" labels for the tokens "","," "Patriots," "Defeated," "Steelers," "in," "the," "AFC," "Championship," " "," and "." In addition, the recurrent neural network 247 may generate "DELETE" labels for the tokens "The," "New," "England," "battled," "through," "the," "rain" "and," "the," "36-17," and "Game." The token extraction unit 249 can then select each token with a "KEEP" token, and generate a summary 251 for the sentence 236 that reads "Patriots Defeated Steelers in the AFC Championship."

The server 230 may transmit 222 the summary 251 of the sentence 236 to the user device 210. At stage B, the summary 251 of the sentence 236 can be displayed in the user interface 211 of the user device 210 in a portion 214 of the user interface 211 that is dedicated to search results. Alternatively, or in addition, the summary 251 of the sentence 236 may be output using audio signals via a speaker of the user device 210.

Figure 3:
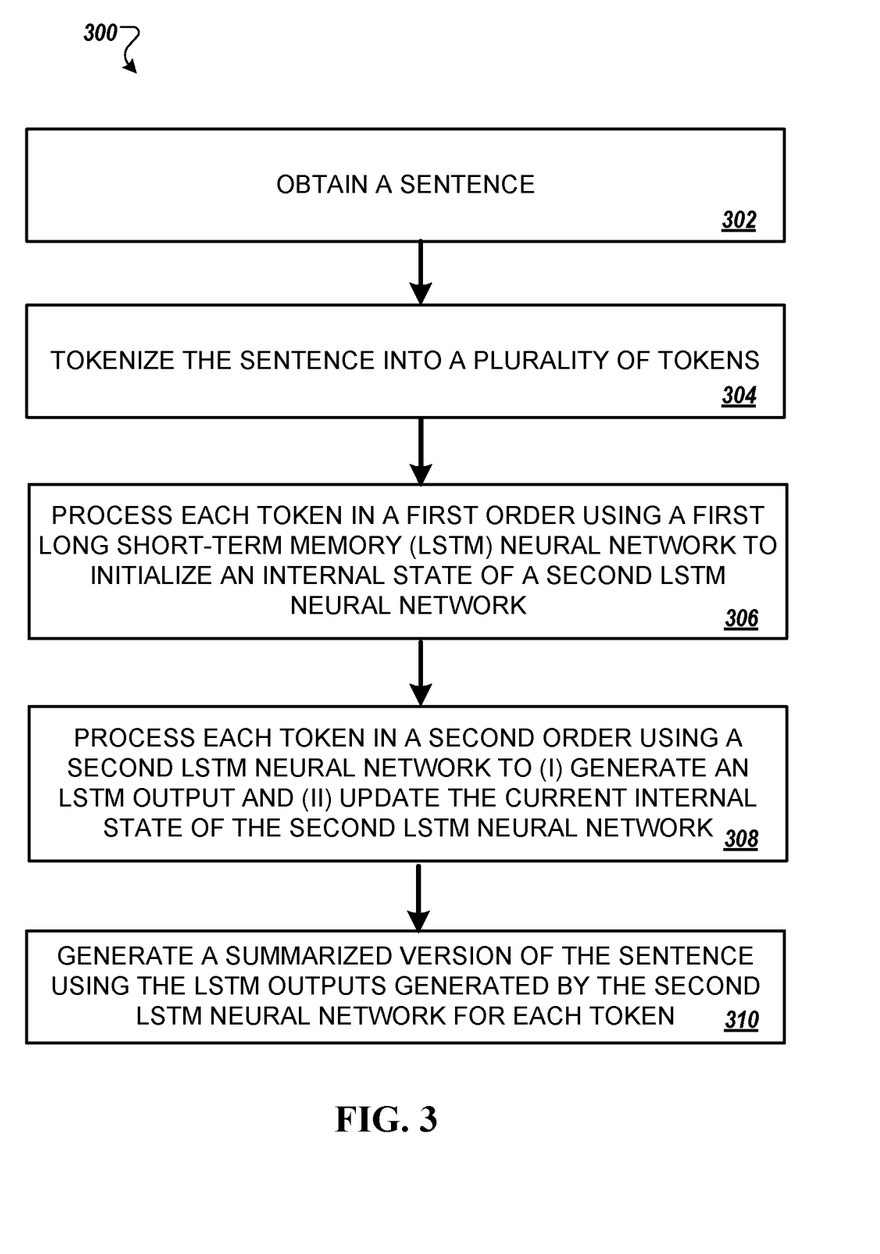
FIG. 3 is a flowchart of an example of a process for generating a summary of a sentence using a recurrent neural network system.

FIG. 3 is flowchart of an example of a process 300 for generating a summary of a sentence using a recurrent neural network system. For convenience, the process 300 will be described as being performed by a system of one or more computers located in one or more locations. For example, a system such as the system 200 can be appropriately programed in accordance with this specification to perform the process 300.

The process 300 begins with the system obtaining 302 a sentence. In some implementations, the sentence may be obtained by the system in response to a search query from a user device. However, the present disclosure need not be so limited. For example, the system may obtain one or more news documents associated with a news feed. In such instances, the system may be configured to extract, from each news document, a headline, or other sentence, that is related to the news document. Alternatively, in other implementations, the sentence may be obtained from a user device.

The system tokenizes 304 the obtained sentence. Tokenizing the sentence may include, for example, parsing the obtained sentence into multiple component parts. For example, the tokenizer may parse the sentence into a plurality of tokens that each represent a particular word of the sentence or a punctuation mark of the sentence. In some implementations, the system may tokenize the sentence into a plurality of tokens without performing any semantic analysis on the sentence or the sentence tokens. The system may provide data that is representative of each respective token to a recurrent neural network for processing. Data representative of each respective token may include a feature vector that is based on one or more features extracted from the token that the feature vector represents.

Alternatively, in some implementations, the system may generate a data structure that captures a relationship amongst the tokens. For example, after tokenizing the obtained sentence into a plurality of tokens, the system may generate a dependency tree based on semantic relationships existing in the obtained sentence. The established dependency tree may allow for more detailed input to be provided to the recurrent neural network as an input. For example, instead of providing just a token as an input to the neural network, the dependency tree can be used to provide to token and its parent token (e.g., a token that is above the token in the dependency tree) for processing by the recurrent neural network.

The system processes 306 each token of the obtained sentence in a first order using a first recurrent neural network. The first recurrent neural network may include a long short-term memory (LSTM) neural network. The first order of tokens may include an order of tokens that is the reverse of the token order in the obtained sentence. Processing of each token of the obtained sentence in a first order may include, for example, the first recurrent neural network iteratively processing (i) data representing the token generated based on the obtained sentence and (ii) the current state of the recurrent neural network. In some implementations, the system does not rely on "KEEP" or "DELETE" determinations made during processing of each respective token in a first order by the first recurrent neural network until the system provides a "GO" token. The updated current state output by the first recurrent neural network that is generated based on the processing of data representing the final token in the set of tokens generated based on the obtained sentence can then be used to initialize the internal state of the second recurrent neural network.

Alternatively, processing each token of the obtained sentence using a first recurrent neural network may include the first recurrent neural network processing additional data. For example, in some implementations, the first recurrent neural network may process, for each token, (i) data representing the token, (ii) data representing the current internal state of the first recurrent neural network, and (iii) data obtained from a dependency tree. Data obtained from the dependency tree may include, for example, the data obtained from the dependency tree may include, for example, data representing of the parent token (e.g., a token that is above the token in the dependency tree). In this alternative implementation, the updated current state output by the first recurrent neural network that is generated based on the processing of data representing the final token in the set of tokens generated based on the obtained sentence can then be used to initialize the internal state of the second recurrent neural network.

The system processes 308 each token in a second order using a second recurrent neural network. The second recurrent network may include a long short-term memory (LSTM) neural network. The second order of tokens may include an order of tokens that is the same as the token order in the obtained sentence. In some implementations, the second recurrent neural network does not begin processing each token in a second order until the second recurrent neural network receives a "GO" token. The "GO" token may provide a signal to the second recurrent neural network that the second recurrent neural network is to begin making "KEEP" or "DELETE" determinations.

Processing of the tokens generated based on the obtained sentence using a second recurrent neural network is performed to generate a "KEEP" or "DELETE" tag for each respective token. The second recurrent neural network may make "KEEP" or "DELETE" determinations for each token generated based on the obtained sentence by processing, for each token, the data representing the token and the second recurrent network's internal state. The output of the second recurrent neural network may include a "KEEP" tag or "DELETE" tag determination for each token, as well as an update to the current internal state of the second recurrent neural network.

Alternatively, processing of the tokens generated based on the obtained sentence using a second recurrent neural network to generate a "KEEP" or "DELETE" tag for each respective token may include the recurrent neural network processing additional data. For example, in some implementations, the second recurrent neural network may process, for each token, (i) data representing the token, (ii) data representing the current internal state of the recurrent neural network, and (iii) data obtained from a dependency tree. The data obtained from the dependency tree may include, for example, data representative of the parent token (e.g., a token that is above the token in the dependency tree), data indicating whether the parent token has been processed and should be included in the summary of the sentence, data indicating whether the parent token has been processed and should not be included in the summary of the sentence, or data indicating that the parent token will be processed later in the second order of tokens. In this alternative implementation, output of the second recurrent neural network may similarly include a "KEEP" tag or "DELETE" tag determination for each token, as well as an update to the current internal state of the second recurrent neural network.

The system may generate 310 a summarized version of the obtained sentence using the outputs of the second recurrent neural network generated by the second neural network for each token. The outputs of the second recurrent neural network may include data that is indicative of "KEEP" or "DELETE" labels for each token. The set of "KEEP" or "DELETE" labels output by the second recurrent neural network may be provided to a token extraction unit. The token extraction unit is configured to extract the set of one or more tokens (e.g., words and punctuation) of the sentence that should be used to generate the summary of the sentence based on the received set of labels provided by the recurrent neural network.

The process 300 can be performed for a sentence for which the desired output, i.e., the summary that should be generated by the system for the input sentence, is not known. The system can also perform the process 300 on inputs in a set of training data, i.e., a set of inputs for which the output that should be predicted by the system is known, in order to train the system, i.e., to determine trained values for the parameters of the recurrent neural networks. In particular, the process 300 can be performed repeatedly on inputs selected from a set of training data as part of a conventional machine learning training technique to train the neural networks, e.g., a stochastic gradient descent backpropagation through time training technique.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A method of generating a summarized version of a sentence, the method comprising:
   tokenizing the sentence into a plurality of tokens;
   processing data representative of each token in a first order using a first long short-term memory (LSTM) neural network to initialize an internal state of a second LSTM neural network;
   processing data representative of each token in a second order using the second long short-term memory (LSTM) neural network, comprising, for data representative of each token in the sentence:
      processing the data representative of the token using the second LSTM neural network in accordance with a current internal state of the second LSTM neural network to (i) generate an LSTM output for the token, wherein the LSTM output indicates whether the token should be included in the summarized version of the sentence, and (ii) to update the current internal state of the second LSTM neural network; and
   generating the summarized version of the sentence using the LSTM outputs for the tokens.

2. The method of claim 1, wherein each of the plurality of tokens is a word or a punctuation mark.

3. The method of claim 1, wherein the LSTM output for each token includes:
   data indicating that a word corresponding to the token should be included in the summarized version of the sentence; or
   data indicating that a word corresponding to the token should not be included in the summarized version of the sentence.

4. The method of claim 3, further comprising:
   for each of the plurality of tokens, associating the LSTM output for the token with a word corresponding to the token.

5. The method of claim 4, wherein generating the summarized version of the sentence using the LSTM outputs for the tokens further comprises:
   selecting only a subset of words that correspond to the tokens that are each associated with data indicating that the word corresponding to the token should be included in the summarized version of the sentence.

6. The method of claim 5, wherein the selected subset of words that correspond to the tokens used to generate the summarized version of the sentence remain in the same order that each respective word appeared in the sentence prior to tokenization.

7. The method of claim 1, wherein the first order of tokens is an order of tokens corresponding to words in the sentence that is the reverse of the order the words corresponding to the tokens appeared in the sentence.

8. The method of claim 1, wherein the second order of tokens is an order of tokens corresponding to words in the sentence that is the same order that the words corresponding to the tokens appeared in the sentence.

9. The method of claim 1, wherein processing data representative of each token in a second order using the second long short-term memory (LSTM) neural network, further comprises, for each token in the sentence:
   processing data indicative of whether (1) the preceding token has been processed and a word corresponding to the preceding token should be included in the summarized sentence, or (2) the preceding token has been processed and a word corresponding to the preceding token should be removed from the summarized sentence.

10. The method of claim 1, the method further comprising:
   parsing the sentence in order to generate a dependency tree,
   wherein processing data representative of each token in a second order using the second long short-term memory (LSTM) neural network, further comprises, for each token in the sentence:
   processing the data representative of the token and a corresponding parent token in the dependency tree.

11. A system comprising:
   one or more computers and one or more storage devices storing instructions that are operable, when executed by one or more computers, to cause the one or more computers to perform the operations comprising:
   tokenizing the sentence into a plurality of tokens;
   processing data representative of each token in a first order using a first long short-term memory (LSTM) neural network to initialize an internal state of a second LSTM neural network;
   processing data representative of each token in a second order using the second long short-term memory (LSTM) neural network, comprising, for data representative of each token in the sentence:
      processing the data representative of the token using the second LSTM neural network in accordance with a current internal state of the second LSTM neural network to (i) generate an LSTM output for the token, wherein the LSTM output indicates whether the token should be included in the summarized version of the sentence, and (ii) to update the current internal state of the second LSTM neural network; and
   generating the summarized version of the sentence using the LSTM outputs for the tokens.

12. The system of claim 11, wherein the LSTM output for each token includes:
   data indicating that a word corresponding to the token should be included in the summarized version of the sentence; or
   data indicating that a word corresponding to the token should not be included in the summarized version of the sentence.

13. The system of claim 12, further comprising:
for each of the plurality of tokens, associating the LSTM output for the token with a word corresponding to the token.

14. The system of claim 13, wherein generating the summarized version of the sentence using the LSTM outputs for the tokens further comprises:
selecting only a subset of words that correspond to the tokens that are each associated with data indicating that the word corresponding to the token should be included in the summarized version of the sentence.

15. The system of claim 14, wherein the selected subset of words that correspond to the tokens used to generate the summarized version of the sentence remain in the same order that each respective word appeared in the sentence prior to tokenization.

16. A non-transitory computer-readable medium encoded with instructions that, when executed by one or more computers, cause the one or more computers to perform the operations comprising:
tokenizing the sentence into a plurality of tokens;
processing data representative of each token in a first order using a first long short-term memory (LSTM) neural network to initialize an internal state of a second LSTM neural network;
processing data representative of each token in a second order using the second long short-term memory (LSTM) neural network, comprising, for data representative of each token in the sentence:
processing the data representative of the token using the second LSTM neural network in accordance with a current internal state of the second LSTM neural network to (i) generate an LSTM output for the token, wherein the LSTM output indicates whether the token should be included in the summarized version of the sentence, and (ii) to update the current internal state of the second LSTM neural network; and
generating the summarized version of the sentence using the LSTM outputs for the tokens.

17. The non-transitory computer-readable medium of claim 16, wherein the LSTM output for each token includes:
data indicating that a word corresponding to the token should be included in the summarized version of the sentence; or
data indicating that a word corresponding to the token should not be included in the summarized version of the sentence.

18. The non-transitory computer-readable medium of claim 17, further comprising:
for each of the plurality of tokens, associating the LSTM output for the token with a word corresponding to the token.

19. The non-transitory computer-readable medium of claim 18, wherein generating the summarized version of the sentence using the LSTM outputs for the tokens further comprises:
selecting only a subset of words that correspond to the tokens that are each associated with data indicating that the word corresponding to the token should be included in the summarized version of the sentence.

20. The non-transitory computer-readable medium of claim 19, wherein the selected subset of words that correspond to the tokens used to generate the summarized version of the sentence remain in the same order that each respective word appeared in the sentence prior to tokenization.

* * * * *

UNITED STATES PATENT AND TRADEMARK OFFICE
CERTIFICATE OF CORRECTION

PATENT NO. : 10,229,111 B1
APPLICATION NO. : 15/423852
DATED : March 12, 2019
INVENTOR(S) : Flippova et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 110 days.

Signed and Sealed this
Twenty-second Day of October, 2019

Andrei Iancu
*Director of the United States Patent and Trademark Office*